H. J. SWEYER.
VEHICLE SAFETY BABY HOLDER FOR USE WITH MOTOR VEHICLES, BUGGIES, CARRIAGES, &c.
APPLICATION FILED JULY 30, 1919.

1,348,334. Patented Aug. 3, 1920.

*Inventor:*
Henry J. Sweyer

UNITED STATES PATENT OFFICE.

HERVEY J. SWEYER, OF CIRCLEVILLE, OHIO.

VEHICLE SAFETY BABY-HOLDER FOR USE WITH MOTOR-VEHICLES, BUGGIES, CARRIAGES, &c.

1,348,334.    Specification of Letters Patent.    Patented Aug. 3, 1920.

Application filed July 30, 1919. Serial No. 314,580.

*To all whom it may concern:*

Be it known that I, HERVEY J. SWEYER, a citizen of the United States, residing at Circleville, No. 155 West High street, in the county of Pickaway and State of Ohio, have invented certain new and useful Vehicle Safety Baby-Holders for Use with Motor-Vehicles, Buggies, Carriages, &c., of which the following is a specification.

My invention consists of a safety baby-holder for use with vehicles, such as motor-vehicles, carriages, buggies &c.

The object of my invention is to safely and comfortably secure a baby to a vehicle seat and prevent it from falling forward, or falling off of the seat upon which it is sitting and thus relieve its custodian from its watch and care, and prevent it from being injured. It may be cheaply constructed and easily and conveniently used. I attain these objects by the use of a device consisting in the construction and novel combination and arrangement of parts hereinafter fully described, illustrated in the accompanying drawings, and pointed out in the claim appended hereto.

Figure 1:
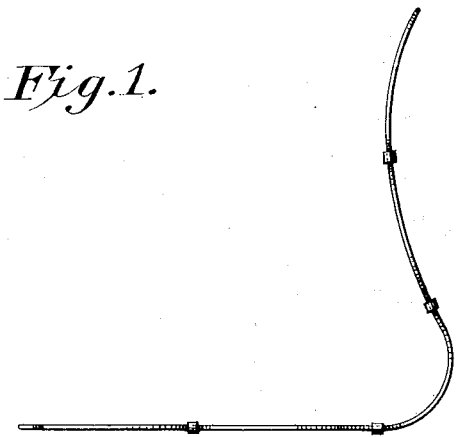
Figure 2:
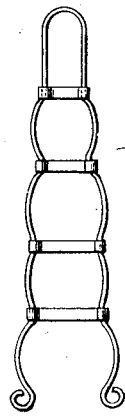
Figure 3:
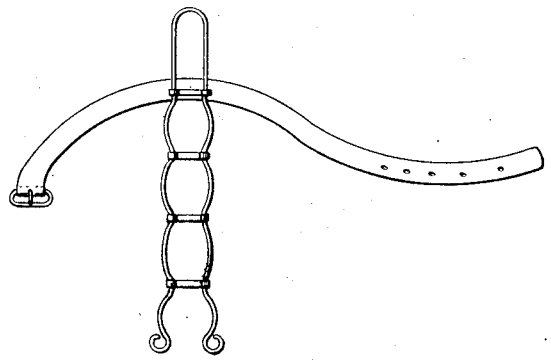

In the accompanying drawings, Figure 1 represents a side view of a part of my device. Fig. 2 shows a front view of the same part of the device, and Fig. 3 shows the combination of the different parts of my invention.

In making my device, especially for commercial use, I can use any suitable material as wire, sheet metal or wood, but for the purpose of this application, I shall use one made of wire as wire can be shaped so that its outline will be of any desired size or shape, and inclose or cover any desired space, so that such space may be utilized as a surface. At present wire can be more conveniently and cheaply used than any other material. A material may be used having a spring to it, thus making it easy on the baby and making a swing for its use and amusement.

Like letters of reference indicate like or corresponding parts throughout the drawings.

In Fig. 1, $a$ represents the curvature in the upright of my device made to conform to the outline of the inner back of the seat of the vehicle on which it is used. This curvature is in the upper and outer part of the upright. $b$ shows the curvature in the inner and lower part of the upright made to receive the inner edge of the vehicle seat upon which the baby sits. It helps to hold the seat more securely together. $c$ shows the base of my device which is placed under the seat. To make this base, the wire is bent, just below $b$, at right angles to the upright.

In Fig. 2, a front view of a part of my device, the wire of which it is made is shown as being bent, in about its middle part, upon itself, the two parts thus formed, running parallel any desired distance apart, until they come to $e$, a clip where they may be somewhat narrowed and fastened together by said clip which strengthens the upright and affords a place of attachment for a belt or any other part hereinafter described. From this point the wires may be widened any desired width and continued any desired length, as shown at $d$, then narrowed somewhat and clipped again as at $e'$. The same process may be repeated from $e'$ to $f$ where it is clipped again. Between $b$ and $f$ the parts of this wire are bent at right angles toward the curvature $b$, and that side of this triangle containing the first bend which is at its middle part constitutes the upright of my invention, and the other side of this triangle containing the free ends of the parts of the wire as $g$ $g'$ constitutes its base. From $f$ the wires may be widened any desired width and continued any desired length as at $h$ $h'$, then neared together and clipped again as at $i$ which process enlarges and strengthens the base and may be continued to form a base of any desired size and strength, finally ending as in $l$ $l'$. In Fig. 3, $m$ is a flexible belt made from any suitable material and is securely attached to the upright at $e$. This belt is fastened around the body of the baby under its arms and holds it safe in place.

To use my invention put the base under the cushion of the seat of the vehicle from the rear near where the baby is to sit, put the inner edge of the cushion in the curve $b$, and fit the upright up along the back of the seat. Place the baby on the seat over the base and in front of the upright and fasten the belt around its body and you have it seated safe in the vehicle. The broad, strong base will prevent it from falling sidewise and the strength of the upright will prevent it from falling forward, thus relieving its custodian from its care. The weight of the baby and the seat on the base, aided by the weight of the baby's custodian will hold the seat down in place and insure the baby safe.

Having thus described my invention, what I claim and desire to secure by Letters Patent is:—

In a vehicle safety baby-holder, a piece of suitable material formed into a right angle and braced at a short distance from the free end of the upright of the angle where its outer edges are converged and clipped, then widened for a short distance, then narrowed and clipped again and so on until the free end of the other side or base of the angle has been reached; the upright of the angle having an inner and an outer concave curve.

In testimony whereof I affix my signature in presence of two witnesses.

HERVEY J. SWEYER.

Witnesses:
 A. A. GREENS,
 GEO. W. DARLING.